Figure 2:
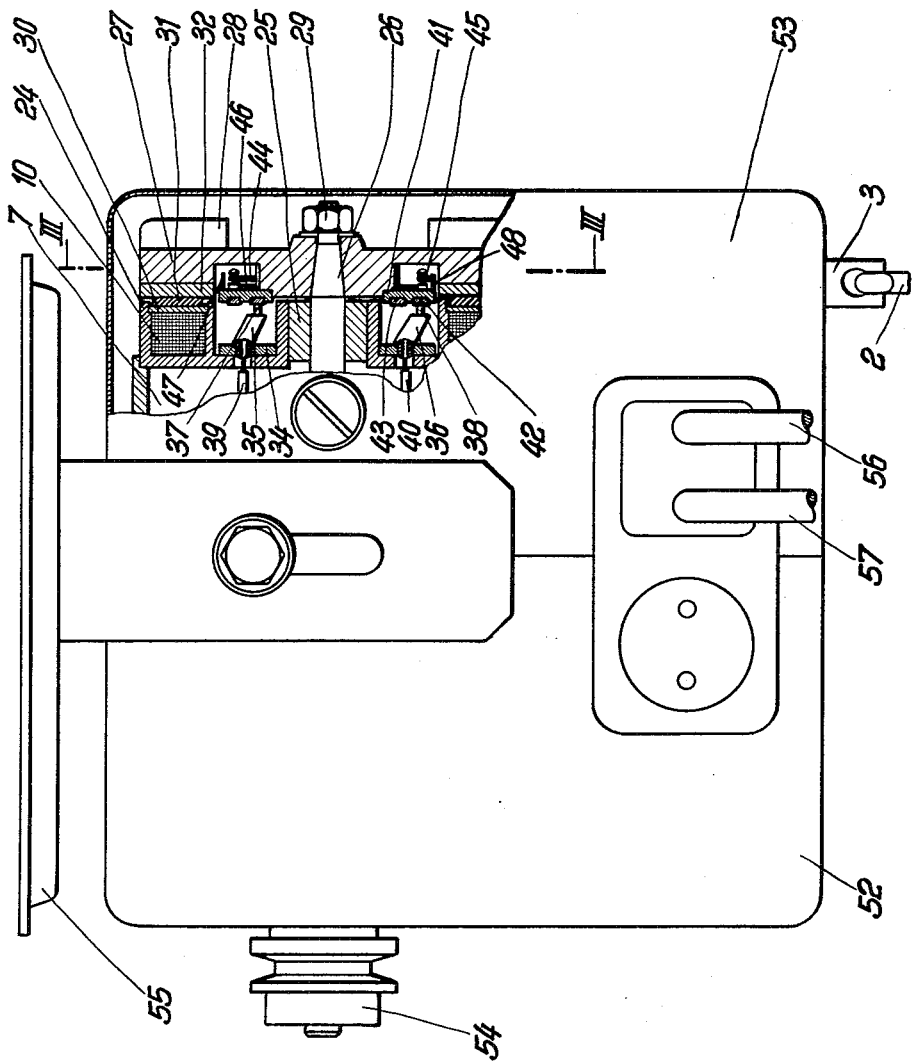

June 8, 1965 A. HEIDT ETAL 3,187,701
ELECTRIC DRIVING DEVICE FOR SEWING MACHINES OR THE LIKE
Filed Aug. 17, 1962 5 Sheets-Sheet 1

Fig.1

Inventors
ALFRED HEIDT
AND ALBERT BELLON
BY Robert K Jacob.
AGT

June 8, 1965  A. HEIDT ETAL  3,187,701
ELECTRIC DRIVING DEVICE FOR SEWING MACHINES OR THE LIKE
Filed Aug. 17, 1962                    5 Sheets-Sheet 2

Inventors
ALFRED HEIDT AND
ALBERT BELLON
BY Robert H. Jacob
AGT.

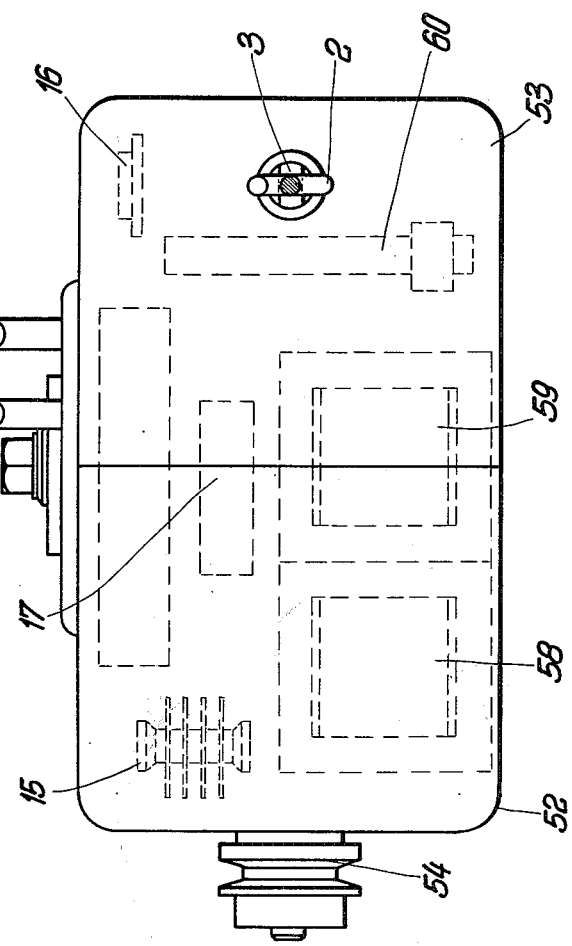

June 8, 1965  A. HEIDT ETAL  3,187,701
ELECTRIC DRIVING DEVICE FOR SEWING MACHINES OR THE LIKE
Filed Aug. 17, 1962  5 Sheets-Sheet 5

Inventors
ALFRED HEIDT AND
ALBERT BELLON
BY Robert K Jacob
AGT.

३,187,701
ELECTRIC DRIVING DEVICE FOR SEWING MACHINES OR THE LIKE
Alfred Heidt, Schwetzingen, and Albert Bellon, Mannheim-Neckarau, Germany, assignors to Firma Frankl & Kirchner, Fabrik für Elektromotoren und elektrische Apparate, Schwetzingen, Baden, Germany
Filed Aug. 17, 1962, Ser. No. 217,670
Claims priority, application Germany, Aug. 23, 1961, F 34,753
3 Claims. (Cl. 112—219)

The invention relates to electric driving gear and is particularly concerned with a driving device or driving means for sewing machines or the like. The device in accordance with the invention is provided with means for stopping the drive in a predetermined position and is intended to make it possible to stop an electrically driven machine in the dead point or dead center position of the needle.

It is known to regulate the running and the control of sewing machines electronically by using current gates connected in the main current supply circuit of the drive motor. In accordance with the invention a particular kind of electronic control is employed which by virtue of its very small current consumption makes possible a compact and space economizing arrangement where all essential components—other than the position indicator which must be provided directly on the machine—can be accommodated in a relatively small and handy housing.

The invention derives from the basic concept that all stopping means of the drive are controlled by way of one or more transistors. Suitably a cut-off and a brake device for the drive means are operated in common by way of a transistor which is controlled as determined by the velocity and position of the drive or of a component driven by it. In one embodiment of the invention a cut-off relay and an electrically controlled brake, preferably an electromagnetic brake, are connected in parallel in the operating circuit of a transistor.

The drive means braking device may be arranged to act upon the rotor or the rotor shaft of an electric motor which drives the machine, but may instead also be arranged to act on an intermediate shaft which constitutes the drive means for the machine and is driven by the motor.

In this embodiment a switching device that depends on the velocity, particularly a centrifugal force switch are in the control circuit of the transistor and a switching means which depends on the position of the drive or of a component driven thereby. This position depending switching means can be controlled in a known manner by an incorporeal position indicator, particularly a light ray and possibly a photo-transistor (Fotistor) or a photo-diode.

The small power consumption of the transistor makes it feasible to construct the velocity controlled switching means in the form of a small centrifugal force switch of particularly simple construction and to install the same in a hollow space in the drive motor or in its brake which rotates with it. As discussed below, the centrifugal force switch may contain two or more contact-making centrifuge weights which rotate about a substantially horizontal axis, at least one of which leaves its contact position under the force of its own weight and without the co-operation of springs or the like as the speed drops below the required number of rotations of the centrifugal switch, thus interrupting the switching circuit. In the preferred embodiment the rated capacity of the centrifugal switch needs to be only a few milliwatts. Therefore it can operate with very small contact pressures and without an auxiliary spring for the centrifugal weights and may accordingly be of simple and cheap construction.

As explained hereinafter, all switching and control components of the driving device may be mounted on an intermediate plate in the housing of the driving motor, so that a driving and control apparatus is provided which can be mounted as a unit in any sewing machine and on other driving devices.

Figure 3:
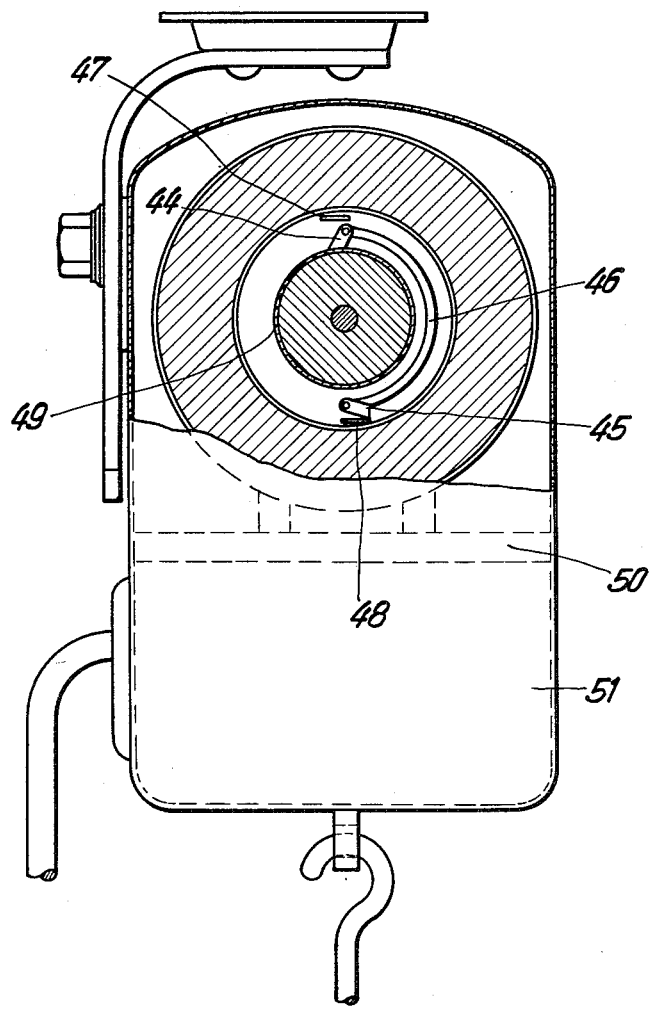
Figure 6:
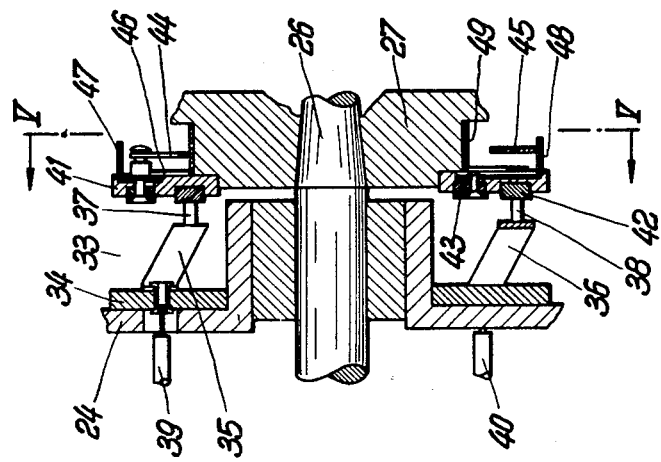
Figure 5:
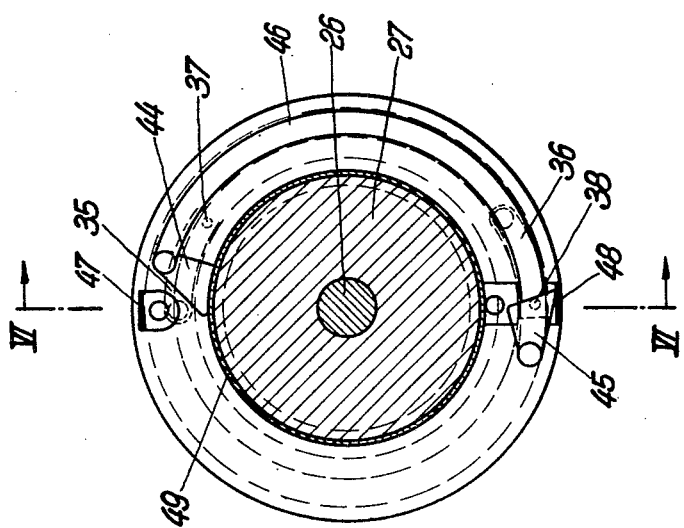

The different advantages and objects of the invention will become more apparent if reference is made to the accompanying drawings which illustrate an embodiment of the inventive concept as applied to a sewing machine drive and in which:

FIG. 1 is a schematic diagram;
FIG. 2 is a front view of a driving and control assembly in accordance with the invention with a partial cross section of the electromagnetic brake;
FIG. 3 is a side view of the device as seen in FIG. 2 with a partial cross section taken along line III—III;
FIG. 4 is a bottom view of the device drawn to a larger scale;
FIG. 5 is a sectional detail relating to FIG. 3 drawn to an enlarged scale and taken along line V—V in FIG. 6; and
FIG. 6 is a section taken along line VI—VI in FIG. 5 and drawn to the same scale.

The schematic diagram in accordance with FIG. 1 shows the drive motor 7 which is a series wound motor which is to be stopped accurately when the transmission of the sewing machine 23 or its needle bar has attained a predetermined position. The motor is connected directly to the one lead 8 of the A.C. current supply line by means of a terminal and with its other terminal is connected to the other lead 9 of the line by way of a regulating starter which includes a resistance 4 and which can be shortened in steps and by way of a pair of contacts 19, 20 connected across said resistance and bridged by a relay 17. An electromagnetic brake serves for stopping the motor, which has a winding 10 that provides the braking power and is connected parallel to relay 17. Thus the relay responds simultaneously with the brake and interrupts the current circuit of the motor while the brake stops the motor which has become devoid of current.

The windings 17 and 10 of the relay and of the brake, respectively, are supplied with a direct current by way of a transformer 12, 13, a rectifier bridge 15 as well as a transistor 16. If need be, the supply can be through intermediate relays which, however, are usually dispensable. For controlling the transistor a centrifugal switch 11 and a light responsive element in the form of a photo-resistor or a photo-transistor 18 are connected in parallel with the collector-base portion CB. The light source 14 beams a ray onto the light responsive element by way of a mirror 21 provided on the balance wheel 22 or another movable part of the sewing machine 23 when the balance wheel or other part has attained a predetermined position.

The starting resistance 4 is operated in a known manner by means of a treadle mechanism 1, 2, 3 which is biased to cut-out position by a tension spring 1a. The transformer 12, 13 and the electric control system supplied by it receive current by way of contacts 5, 6 only when the treadle mechanism is in this cut-out position.

The operation of the circuit and braking device associated therewith is effected when the starter 4 which may be a pressure carbon control or a pressure resistance is actuated on moving the treadle 1, the draw bar 2 and the lever 3 in the direction of the arrow to open stationary contacts 5 and 6; the series wound motor 7 is supplied with potential from the line leads 8, 9 so that the machine begins to move. Opening of the stationary contacts 5, 6 disconnects the entire control circuit and the electromagnetic brake.

In order to stop the motor 7 no further pressure is applied to the treadle and the starting resistance 4 is moved back by the spring 1a until the current supply is cut off. The stationary contacts 5 and 6 close before the series motor 7 comes to a standstill so that the control system is supplied with potential and the electromagnetic brake 10 is rendered operative as long as the centrifugal force switch 11 remains closed as a result of the high velocity of the sewing machine. In point of time the stationary contact 5 is closed before stationary contact 6. The primary winding 12 of the transformer is now connected to the line and the secondary winding 13 supplies a potential to the light source 14. The potential is also supplied by way of the rectifier bridge to the control circuit which comprises the emitter-collector portion EC of the transistor 16 in series with the winding of the magnetic brake 10 or the relay 17 connected in parallel thereto. The base potential for the control circuit of the transistor is taken at the collector C. The photo-transistor 18 or photo-diode and the centrifugal force switch 11 are provided in the control circuit.

If on closing the contact 5 the series motor 7 still rotates at a number of rotations that exceeds a value determined by the structural features of the centrifugal force switch, the centrifugal force switch 11 remains closed. The transistor 16 is then conductive and of low resistance so that the electromagnetic brake 10 is excited and simultaneously relay 17 is caused to respond. The relay 17 thus opens the stationary contacts 19 and 20 so that during the braking operation the motor 7 remains disconnected from the line. The motor is braked down until a predetermined number of rotations is attained, the centrifugal force switch 11 opens, so that the control is taken over by the photo-transistor 18. If the transistor is beamed with a ray of light from the light source 14 by way of the reflecting surface 21 on the balance wheel 22, its resistance is reduced and the base of the transistor 16 continues to receive the control potential so that the magnetic brake 10 and relay 17 remain excited and the motor is braked until it comes to a standstill.

The setting of the reflecting surface 21 on the balance wheel 22 of the sewing machine 23 corresponds to the position of dead center of the sewing machine needle.

If the machine overruns this position so that by further turning of the balance wheel 22 the reflecting surface 21 and the photo-transistor 18 are no longer in the range of the light beam from source 14, then the resistance of the element 18 is increased and the base of the transistor 16 does not receive control potential. The transistor in turn becomes highly resistant and opens the control circuit. The magnetic brake 10 thus is deprived of current, the relay 17 closes the contacts 19 and 20, so that the series motor 7 receives potential from the line and continues to run so long until the reflecting surface 21 again throws the light ray upon the photo-transistor 18. Thus the magnetic brake 10 becomes effective and the contacts 19 and 20 are opened.

Since the transistor 16 requires only small control currents, neither the light resistant element 18 nor the centrifugal force switch 11 need to carry heavy currents. The latter can be constructed correspondingly small in size and can be arranged in the driving device in a manner to save space. This results in a very convenient and condensed form of construction of the driving device such as illustrated in FIGS. 2 and 3.

In lieu of the conventional supporting plate at the collector end the series motor 7 contains a magnetic housing 24 which carries the bearing 25 for the rotor shaft 26. The magnetic armature 27 is provided with ventilator plates 28 and is connected to the rotor shaft 26 by means of the nut 29. The magnetic coil 10 is covered with a non-magnetic disk 30 and that carries a friction surface 31. A magnetic disk 32 is threadedly connected with the magnetic armature 27. The electromagnetic brake is shown in activated condition whereby the rotor is braked. With the brake disconnected and the motor 7 in operative condition the magnetic disk 32 is moved away from the friction surface 31 because the rotor is pulled into the stator, effecting a small axial movement.

In a hollow space 33 of the magnetic housing 24 the centrifugal force switch 11 (FIG. 1) is mounted, the stationary part of which is provided on the magnetic housing 24. The insulating disk 34 supports two spring elements 35 and 36 to which are fastened the carbon brushes 37 and 38. The current is supplied through the leads 39 and 40. The rotating part of the centrifugal force switch is secured to the magnetic armature 27 and consists of an insulating plate 41 having two concentrically arranged metal slip rings 42 and 43. The carbon brush 37 serves for supplying current to the slip ring 43 and the carbon brush 38 for supplying current to the slip ring 42.

Two centrifugal weights 44 and 45 are electrically connected with each other by way of a metal bail or strap 46 and are adapted to establish contact with members 47 and 48 disposed opposite from them. Neither biasing springs nor other return means are required.

At the higher numbers of rotation of the rotor the two centrifugal weights 44 and 45 engage the contacts 47 and 48 which are connected with the slip rings and provide for the current flow while at lower numbers of rotation one or both centrifugal weights drop down or hang down owing to their inherent weight, thus interrupting the current flow. An insulating sleeve 49 is provided on which the centrifugal weights may rest without establishing contact.

The components and switch means necessary for the control are mounted in accordance with the invention upon a common supporting plate 50 and are accommodated in the hollow space 51. Only the photo-transistor 18 and the light source 14 are not accommodated in the hollow space 51 but are both mounted proximate the balance wheel 22 and can be combined in a unit that is in a light of sight with the balance wheel 22 (as indicated in FIG. 1 by a common housing shown in dashed lines).

The reflector 21 may also be provided on a different movable part of the sewing machine, for example, on the needle bar for which purpose the unit must be in a line of sight with the needle bar. The reflector need not be a separate part but may be in the form of a sufficiently bright reflecting surface portion of the balance wheel or of the needle bar.

The motor with the built-in magnetic brake and built-in centrifugal switch, the plate 50 including the components and control elements and the operating members for the starting resistance are enclosed by the half shells 52 and 53 of the motor housing and thus are in a common housing. The belt pulley 54 is in operative communication with the upper part of the sewing machine by means of a V-belt, not illustrated. The pedestal 55 which may be adjusted in longitudinal direction permits mounting the entire assembly on the table top of the sewing machine. In FIG. 2 are furthermore shown the power supply lead 56 (8, 9 in FIG. 1) and the connecting lead 57 for the light control on the sewing machine wheel. FIG. 4 indicates the manner of mounting the transistor 16, the rectifier 15, the relay 17 of the transformer 58 with the primary coil 12 and secondary coil 13. A further transformer 59 is provided for the general lighting and the set of contacts for the starting resistance 4 that is also indicated in FIG. 1 is indicated in dashed lines.

The centrifugal force switch also visible in FIGS. 2 and 3 is illustrated on an enlarged scale in FIGS. 5 and 6. The components already described in FIGS. 2 and 3 are identified by the same reference numerals.

While I have described my invention in connection with a sewing machine, it is obvious that it can also be applied to other types of rotary machines, and I do not wish to be limited to the embodiment described and shown, but what I desire to protect by Letters Patent of the United States is set forth in the accompanying claims.

We claim:

1. In a sewing machine having an electric motor, a rotatable shaft and brake means operatively related to said shaft, control means for operating said brake means to stop said motor in a predetermined position, said control means comprising an electromagnetic coil mounted around said shaft for controlling said brake means, a line power supply circuit and a motor power circit, a transformer, an adjustable starter including a plurality of regulating resistances adapted to be short circuited step-by-step operable in sequence one after the other to connect said supply circuit to said motor power circuit and including a pair of contacts in the circuit of said transformer adapted to connect said transformer to said power supply circuit, a control pedal operative alternately to short circuit said resistances and to connect said contacts, a relay connected parallel to said coil and having a pair of contacts in a circuit across said starter, a rectifier bridge circuit connected to said transformer adapted to supply direct current to said coil and to said relay, a transistor having an emitter connected to said bridge circuit and a collector connected to said coil, a light source supplied with current by said transformer, a centrifugal switch mounted for movement with said shaft and connected intermediate said coil and the base of said transistor, a reflector such as a mirror provided on a movable part of said machine, and a photo transistor operatively disposed in relation to said reflector and to said light source and connected to said coil and to said transistor base and shunted across said centrifugal switch.

2. In a sewing machine having an electric motor, a rotatable shaft and brake means operatively related to said shaft, control means for operating said brake means to stop said motor in a predetermined position, said control means comprising an electromagnetic coil mounted around said shaft for controlling said brake means, a line power supply circuit and a motor power circuit, a transformer, an adjustable starter including a plurality of regulating resistances adapted to be short circuited step-by-step operable in sequence one after the other to connect said supply circuit to said motor power circuit and including a pair of contacts in the circuit of said transformer adapted to connect said transformer to said power supply circuit, a control pedal operative alternately to short circuit said resistances and to connect said contacts, a relay connected parallel to said coil and having a pair of contacts in a circuit across said starter, a rectifier bridge circuit connected to said transformer adapted to supply direct current to said coil and to said relay, a transistor having an emitter connected to said bridge circuit and a collector connected to said coil, a light source supplied with current by said transformer, a centrifugal switch mounted for movement with said shaft and connected intermediate said coil and the base of said transistor, a reflector such as a mirror provided on a movable part of said machine, and a photo transistor operatively disposed in relation to said reflector and to said light source and connected to said coil and to said transistor base and shunted across said centrifugal switch, said braking means further including a non-magnetic disk presenting a frictional surface, a magnetic housing for said coil, a bearing intermediate said housing and said rotatable shaft, a magnetic armature having ventilator plates secured to said rotatable shaft, a magnetic disk threadedly mounted on said armature movable with said shaft relative to said frictional surface.

3. In a sewing machine having an electric motor, a rotatable shaft and brake means operatively related to said shaft, control means for operating said brake means to stop said motor in a predetermined position, said control means comprising an electromagnetic coil mounted around said shaft for controlling said brake means, a line power supply circuit and a motor power circuit, a transformer, an adjustable starter including a plurality of regulating resistances adapted to be short circuited step-by-step operable in sequence one after the other to connect said supply circuit to said motor power circuit and including a pair of contacts in the circuit of said transformer adapted to connect said transformer to said power supply circuit, a control pedal operative alternately to short circuit said resistances and to connect said contacts, a relay connected parallel to said coil and having a pair of contacts in a circuit across said starter, a rectifier bridge circuit connected to said transformer adapted to supply direct current to said coil and to said relay, a transistor having an emitter connected to said bridge circuit and a collector connected to said coil, a light source supplied with current by said transformer, a centrifugal switch mounted for movement with said shaft and connected intermediate said coil and the base of said transistor, a reflector such as a mirror provided on a movable part of said machine, and a photo transistor operatively disposed in relation to said reflector and to said light source and connected to said coil and to said transistor base and shunted across said centrifugal switch, said centrifugal switch being secured in said magnetic housing and comprising a stationary portion including a base of insulating material concentric with said shaft and supporting in juxtaposition a pair of spring elements each supporting one carbon brush, a pair of power supply leads, one each connected to one said spring element, and a rotatable portion secured to said armature comprising an insulating plate, two metal slip rings mounted concentric with said shaft one for engagement with one and the other for engagement with the other, said carbon brush, a pair of centrifugal weights, a current conducting metal bail supporting one of said weights at each of its ends, a pair of contact members one each connected to one said metal slip ring, and an insulating sleeve on said armature interposed between said weights and said armature.

References Cited by the Examiner
UNITED STATES PATENTS

| | | | |
|---|---|---|---|
| 2,129,847 | 9/38 | Knodel. | |
| 2,920,221 | 1/60 | Schwab | 112—219 X |
| 2,920,257 | 1/60 | Miles et al. | 112—219 X |
| 2,946,418 | 7/60 | Leeson | 192—18.2 X |

JORDAN FRANKLIN, *Primary Examiner.*